Figure 3:
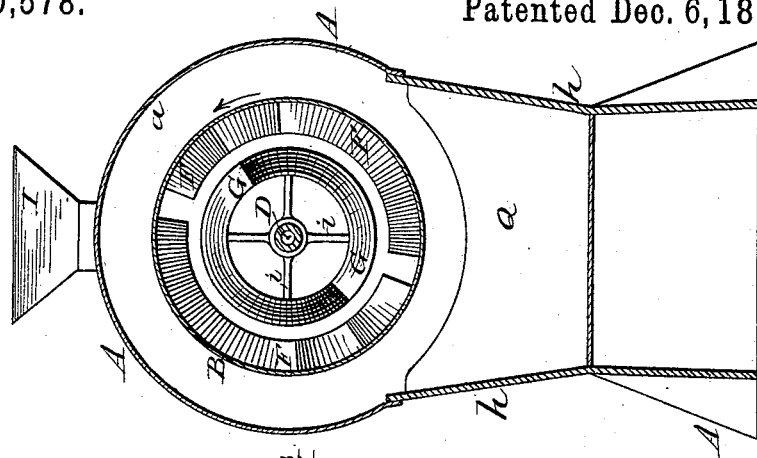

(Model.)
G. W. RICHMOND.
COFFEE ROASTER.
No. 250,578.   Patented Dec. 6, 1881.
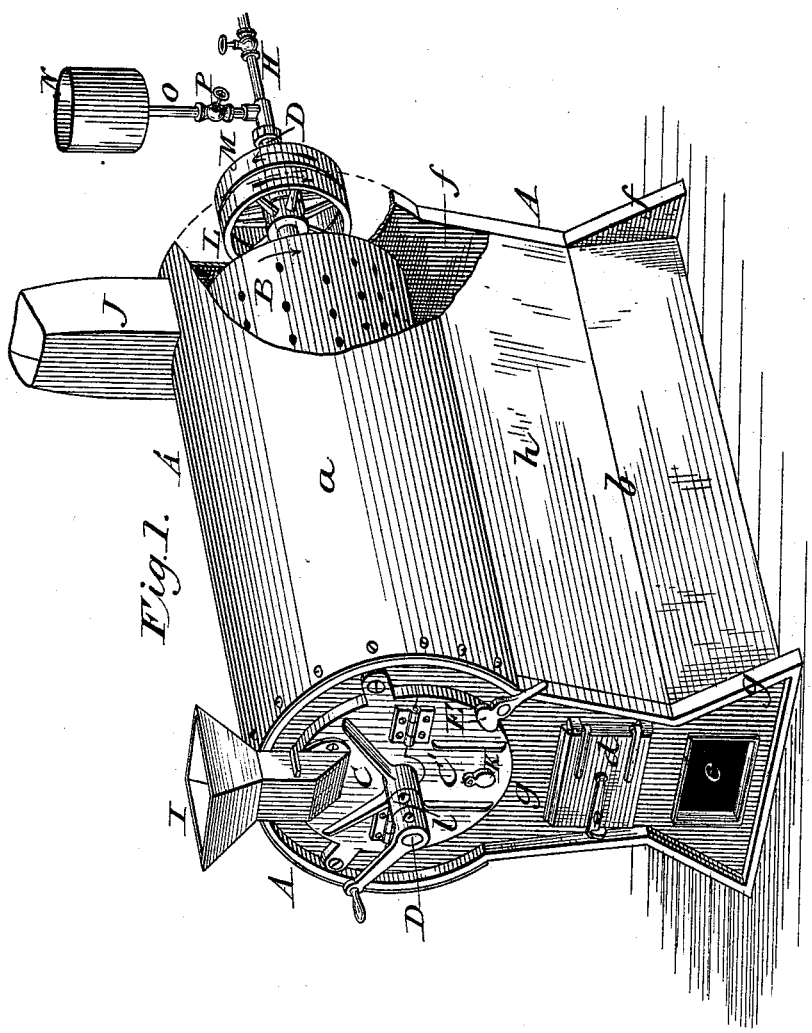
Attest.
Sidney P. Hollingsworth,
Walter S. Dodge.
Inventor.
George W. Richmond,
by Dodge & Son,
Attys.

(Model.)

G. W. RICHMOND
COFFEE ROASTER.

No. 250,578.

2 Sheets—Sheet 2.

Patented Dec. 6, 1881.

Attest.
Sidney P. Hollingsworth
Walter S. Dodge

Inventor.
George W. Richmond,
by Dodge & Son,
Attys.

UNITED STATES PATENT OFFICE.

GEORGE W. RICHMOND, OF WASHINGTON, D. C., ASSIGNOR OF ONE-HALF TO JAMES A. SWEENY, OF SAME PLACE.

COFFEE-ROASTER.

SPECIFICATION forming part of Letters Patent No. 250,578, dated December 6, 1881.

Application filed September 7, 1881. (Model.)

*To all whom it may concern:*

Be it known that I, GEORGE W. RICHMOND, of Washington, in the county of Washington and District of Columbia, have invented certain Improvements in Coffee-Roasters, of which the following is a specification.

My invention relates to a method of and apparatus for roasting coffee in bulk.

The method consists in placing the coffee in a rotary cylinder or other receptacle within a heating-chamber and permitting the roasting to proceed to the point of finish or completion, and then admitting steam to the interior of the receptacle, either alone or with suitable liquid, thereby instantly stopping the roasting action.

The apparatus consists of a rotary drum provided with blades or wings, to cause the proper movement of the coffee, mounted within a heating-chamber, and provided with a steam pipe or inlet communicating with a suitable steam-supply.

The invention relates, also, to various details of construction hereinafter explained.

In the roasting of coffee in large quantities it has been found impracticable to complete the roasting in the containing chamber or cylinder and under the influence of the heating agent, for the reason that after the coffee is removed from the cylinder and exposed to the air the highly-heated mass, receiving an abundant supply of oxygen, will burn or continue to roast for a considerable space of time, and, as a consequence, coffee which appears to be roasted to just the proper degree will, after exposure to the air, become black and be so burned as to be unfit for use. It is therefore customary to remove the coffee before the roasting is completed, and to permit the subsequent action to bring it to the proper or desired condition, constant stirring being required during the finishing operations in order to secure an even roasting of the mass. This plan requires very nice regulation and careful attention, and demands the services of skilled and experienced attendants, and even then it often happens that the perfect point of roasting is not attained. Moreover, a large volume of smoke arises from the coffee when withdrawn from the roasting-receptacle under the common plan, which is a serious objection.

I have discovered that by bringing the coffee to the point of finished or perfect roasting in the roasting cylinder or receptacle, and then admitting a small quantity of steam, the roasting is instantly checked, and that upon withdrawing the coffee thereafter no smoke arises therefrom. I also find that by this plan the natural oil of the berry, which comes to the surface in roasting, is set, and a polished or glazed appearance is given to the berries, while at the same time all dust and light flaky matters are carried off. This glazing of the berry greatly improves the appearance and consequently the salability of the coffee, and, being due to the natural oil of the berries, affords no ground of objection, such as is raised by some to the subsequent glazing by other plans.

Figure 2:
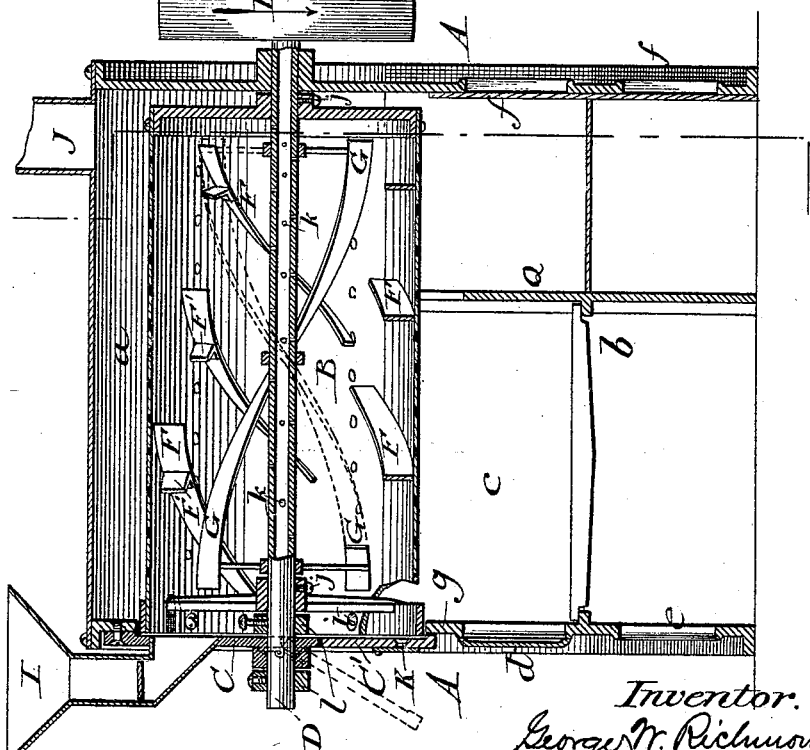

In the accompanying drawings, which represent the preferred form of my apparatus, Figure 1 represents a perspective view of the roaster; Fig. 2, a vertical longitudinal section, and Fig. 3 a vertical transverse section.

The method above set forth may be carried out in other forms of apparatus; but that illustrated in the annexed drawings is deemed best.

A represents a roasting oven or furnace, provided with a cylindrical upper portion, *a*, and a base, *b*, containing a fire-chamber, *c*, and provided with the usual fire-chamber and ash-pit doors, *d* and *e*. The body of the furnace is preferably formed of cast-iron ends *f* and *g*, and cast-iron sides *h*, for the base portion, while the cylindrical or upper portion is formed of plate or heavy sheet metal bent to the desired shape and properly attached to the end sections. The rear-end casting is formed complete in one piece; but the forward end is cast with a large circular opening in its upper part to permit the insertion and removal of the roasting cylinder or receptacle B, said opening being closed when the cylinder is in place by a covering plate or head, C, which also forms the hanger of the cylinder-shaft D.

As shown in Figs. 1 and 2, the head C is formed in two parts, the upper being secured to the front *g*, and the lower section, C', being hinged to the upper one, in order that it may be opened to permit the removal of the contents of the cylinder, and a catch or fastening, E, is furnished for holding the door or lower section closed.

The receptacle B, in which the coffee is placed, consists of a sheet-metal cylinder closed at its rear end, and supported at its forward end by a spider or skeleton head, $i$, formed with an annular band or rim, to which the cylinder is secured by screws or bolts, the body of the cylinder being perforated to permit smoke and moisture to escape. The spider and rear end of the cylinder are secured to the supporting-shaft D by set-screws $j$, passing through their hubs and bearing upon the shaft, and collars $l$ are secured in the same manner inside and outside of the head C, by which arrangement the ready adjustment of the cylinder upon the shaft is permitted. Within the cylinder are two sets of blades or vanes, F and G, of spiral form and reverse curvatures, by which the coffee is stirred and agitated. The blades F are furnished with angle pieces or ledges F', which intercept the coffee in its movement along the blades and cause it to be raised up and turned over by the blades, and thereby to be more thoroughly mixed and agitated than can be done by the smooth or plain blades commonly used. The two sets of blades also cause a very thorough agitation and mingling of the berries. The blades F are secured to the inner surface of the cylinder, and the blades G are carried by arms projecting radially from hubs secured upon the shaft D.

As indicated in the drawings, the shaft D is of hollow or tubular form and closed at its forward end, and is provided with a series of perforations, $k$, preferably arranged in a spiral line or order from one end of the cylinder to the other. The shaft extends outward through both ends of the furnace A, and at the rear end communicates by a pipe, H, with a steam boiler or supply, said pipe being furnished with a valve, by which such communication may be instantly opened or closed. A small opening, K, furnished with a door or cover, is provided for the purpose of examining the coffee from time to time to ascertain its condition, and the shaft D is furnished with two pulleys, L and M, one carrying a straight and the other a crossed belt.

Thus constructed, the apparatus is ready for use. The cylinder B is supplied with coffee through the hopper I, fire being kindled in the chamber $c$, and the smoke and products of combustion passing off through the flue or stack J. The cylinder is then rotated in the direction indicated by the arrows in Figs. 1 and 3, and the coffee is agitated by the blades and carried continually toward the back end thereof by blades F, returning to the forward end at the middle of the cylinder. The rotation is continued until the roasting is completed, at which time the valve of the steam-pipe H is opened, and steam (preferably live steam) is admitted to the hollow shaft D, whence it escapes through the perforations $k$, and checks the roasting. The direction of rotation of the cylinder is then changed, thus causing the coffee to be moved by the blades F toward the forward end of the cylinder, and the door C' is opened, thus permitting the coffee to be discharged. The direction of rotation is determined by bringing the belt of one or the other pulleys L M into use as the driving-belt.

As above stated, the effect of the introduction of steam in the manner described is not only to check the roasting, but to set the oil on the surface of the berry, thus giving the same a glazed appearance, and also to carry off the dust and flaky matters. In some cases, however, it is desirable to inject with the steam a small quantity of glucose, oil, or other glazing material. For this purpose I provide a small vessel or tank, N, to contain the same and connect said tank by a pipe, O, with the steam-pipe H, providing said pipe O with a valve, P, at its lower end, and arranging it to enter the steam-pipe between the valve of the latter and the cylinder B. When thus arranged the valve P may be opened, to allow a proper quantity of the glazing or dressing substance to enter the steam-pipe, whence it will be carried by the steam into the cylinder, and caused to permeate the entire mass of coffee therein, and to act upon every part alike.

It is apparent that instead of reversing-pulleys any other well-known reversing-gear may be employed.

In practice I have found that after the coffee is completely roasted it may be allowed to remain in the cylinder and over the fire for some minutes without injury, if steam be admitted; hence it is impossible to burn a batch of coffee, if reasonable care be exercised.

It will be observed that each end casting is formed with openings for the fire-chamber and ash-pit doors; hence by properly locating the partition Q the fire-chamber may be located at either end, the openings at the opposite end being closed.

The steam which I employ contains more or less moisture, and usually is saturated steam, dry or superheated steam being useless for the purposes of this invention.

I am aware that it has been proposed to carry off the moisture driven from the coffee in a tight roasting-cylinder through hollow journals connected by a pipe passing through the fire, the purpose stated being to restore to the coffee the oil or moisture driven off therefrom. Such a plan is, in my judgment, wholly impracticable, for the reasons that the necessary circulation cannot be thus secured; that the moisture or vapor in passing through the connecting-pipe is superheated and rendered dry; hence there is nothing for the berries to absorb; that if moisture be brought into and allowed to remain in the cylinder the roasting action will cease and a steaming or cooking action will take its place; that coffee in a highly-heated state will not absorb moisture, unless after the essential oil of the berry is driven off, and this is a point which must not be reached, as the coffee would be thereby rendered practically worthless.

I am further aware that it has been proposed to condense in a separate chamber the moisture driven off in roasting, and to return it in the form of a liquid to the coffee after the latter has sufficiently cooled. By my plan the steam is not introduced until the roasting action is completed, and being then admitted it instantly checks the roasting, sets the oil upon the berries, and drives off the husks and dust through the perforated cylinder into the surrounding heating-chamber. It is essential to the attainment of the best results that the exposed cylinder in which the coffee is roasted be perforated to permit the moisture to escape readily, and to allow the husks and dust to be driven off by the steam, it being found that in a closed or tight cylinder the coffee is more or less steamed or cooked, and that a deposit is formed which smuts or blackens the berries.

I am also aware that the heating-chamber or oven of a coffee-roaster has been provided with doors, to permit the cylinder to be withdrawn, and that in other cases the cylinder has been arranged to project through the end of the casing, and furnished with a movable head or a damper or door, to permit the removal of the coffee. These features, therefore, I do not claim.

Having thus described my invention, what I claim is—

1. The herein-described method of roasting coffee, consisting in roasting the same to the finished or perfect point, and then subjecting it to the direct contact of steam, substantially in the manner set forth.

2. The method of treating coffee herein set forth, which consists in roasting the same to the point of finish, and then introducing into the mass steam mingled with glucose or other well-known glazing substance.

3. The herein-described apparatus for roasting coffee, consisting of the heating-chamber A, provided with an outlet-flue, cylinder B, mounted in said chamber and having its exposed surface perforated to permit the escape of moisture, husks, and dust, and the hollow perforated shaft D, communicating with a steam-supply, substantially as shown and described.

4. In a coffee-roaster, the combination of a furnace or heating-chamber provided with a chimney or outlet-flue, a receptacle to contain the coffee, a steam-inlet, and an inlet for glazing or dressing material, arranged to deliver into or in front of the steam-jet, substantially as set forth.

5. A coffee-roaster consisting of a heating-chamber having a stationary head provided with a door or outlet at the lower side, a cylinder mounted on a shaft within the furnace, and having its forward end open, and one or more spiral blades arranged within the cylinder, and adapted to deliver the coffee therefrom through the door or outlet, as set forth.

6. In a coffee-roaster, substantially such as described and shown, a stationary furnace head or plate, C, provided with a central opening to receive and support the cylinder-shaft, and with a hinged section to permit the emptying of the cylinder.

7. A cylinder for coffee-roasting machines, consisting of the sheet-metal body provided with internal wings or blades, the central shaft, a closed head, and a spider-head provided with an annular rim, the heads being secured to the shaft by set-screws, as and for the purpose explained.

GEORGE W. RICHMOND.

Witnesses:
J. A. SWEENY,
WILLIAM W. DODGE.